(12) United States Patent
Hospital

(10) Patent No.: US 6,694,564 B2  
(45) Date of Patent: Feb. 24, 2004

(54) RECIPROCATING LINEAR SWEEPING WIPER MECHANISM COMPRISING IMPROVED MEANS GUIDING THE CARRIAGE IN ITS GUIDE RAIL

(75) Inventor: Eric Hospital, Montigny le Bretonneux (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 10/169,214

(22) PCT Filed: Dec. 21, 2000

(86) PCT No.: PCT/FR00/03627

§ 371 (c)(1),
(2), (4) Date: Jun. 26, 2002

(87) PCT Pub. No.: WO01/47758

PCT Pub. Date: Jul. 5, 2001

(65) Prior Publication Data

US 2002/0189044 A1 Dec. 19, 2002

(30) Foreign Application Priority Data

Dec. 27, 1999 (FR) .............................................. 99 16513

(51) Int. Cl.⁷ ................................................. B60S 1/20
(52) U.S. Cl. ................................. 15/250.24; 15/250.29; 74/27; 74/37
(58) Field of Search ......................... 15/250.24, 250.29, 15/250.3; 74/27, 37, 500.5; 254/389, 390, 393, 394, 399

(56) References Cited

U.S. PATENT DOCUMENTS 5,713,098 A    2/1998  Mayer et al. ............. 15/250.24

FOREIGN PATENT DOCUMENTS

| DE | 947 532 | | 2/1956 | | |
|----|---------|---|--------|---|---|
| DE | 947532 | * | 8/1956 | ............. | 15/250.29 |
| DE | 962 317 | | 10/1956 | | |
| DE | 1167202 | * | 4/1964 | ............. | 15/250.24 |
| FR | 1 121 126 | | 7/1956 | | |
| FR | 2 658 460 | | 8/1991 | | |
| GB | 887114 | | 1/1962 | | |
| GB | 1 288 091 | | 9/1972 | | |
| IT | 643248 | * | 7/1962 | ............. | 15/250.24 |
| WO | WO 86/00052 | | 1/1986 | | |

* cited by examiner

Primary Examiner—Gary K. Graham  
(74) Attorney, Agent, or Firm—J. Gordon Lewis

(57) ABSTRACT

A reciprocating linear sweeping wiping mechanism includes a guide and drive carriage bearing at least a wiper element slidingly mounted inside at least a rigid longitudinal guide rail produced in the form of a hollow extruded profile. The transverse positioning of the frame plate relative to the extruded profile includes a longitudinally oriented rigid rib borne by the extruded profile or by a frame plate, which is received longitudinally sliding in a vertically open matching longitudinal groove borne by the frame plate or the extruded profile, respectively, and each stabilizing element is a stabilizing pad which is longitudinally slidingly received inside the corresponding C-shaped slide rail.

14 Claims, 2 Drawing Sheets

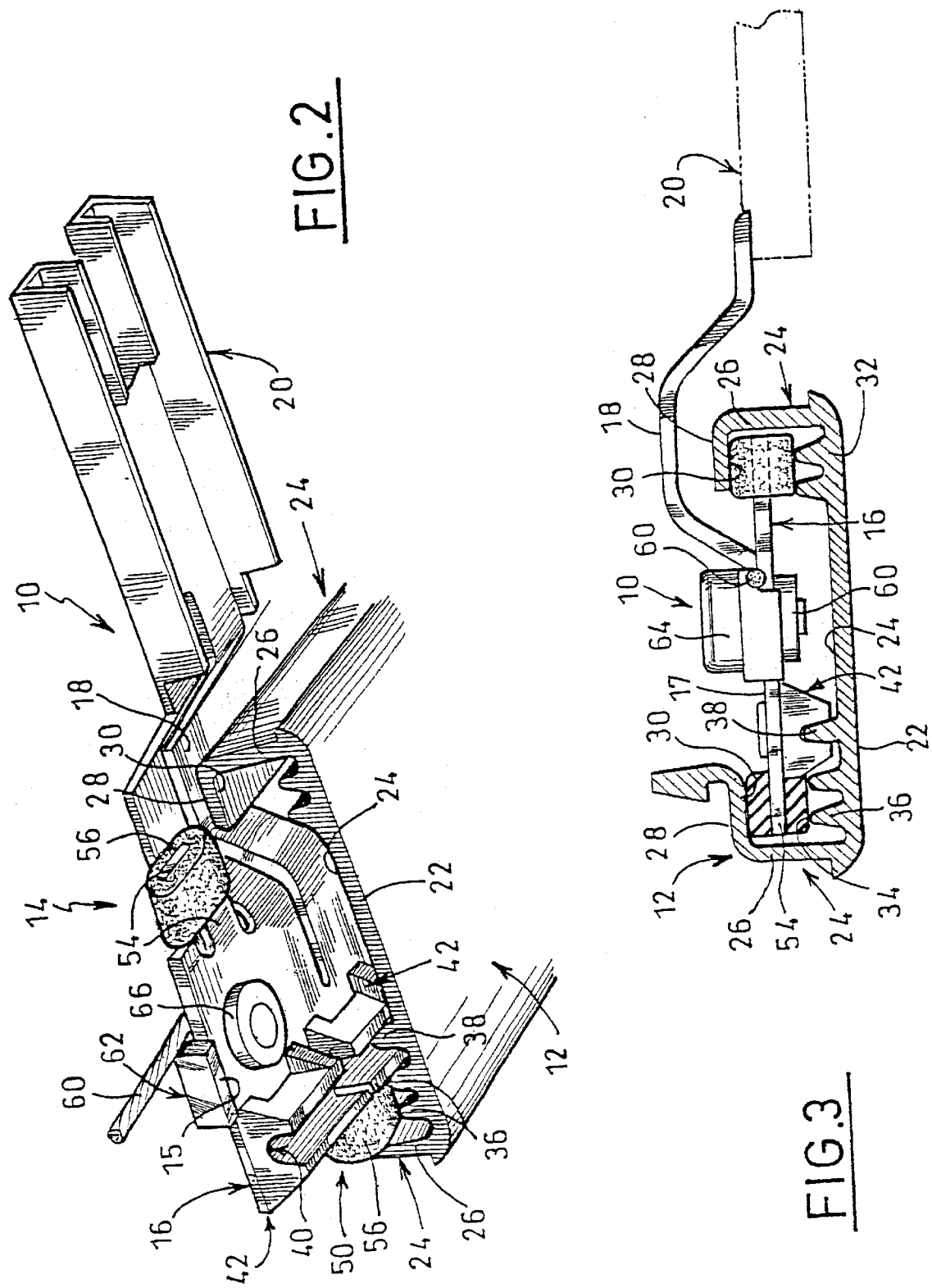

RECIPROCATING LINEAR SWEEPING WIPER MECHANISM COMPRISING IMPROVED MEANS GUIDING THE CARRIAGE IN ITS GUIDE RAIL

BACKGROUND

This invention relates to a motor vehicle reciprocating linear sweeping wiping mechanism.

The invention aims to allow the wiping of a windshield or a rear window of a motor vehicle. According to the broadest conception in the domain of automobile construction, each wiper presents a reciprocating wiping of the window to be wiped in a reciprocating rotational movement around an axis notably fixed relative to the frame structure of the window. Such wiping, whether it is carried out by means of one wiper or by two parallel or opposing sweeping wipers, leaves relatively important parts of the window unwiped.

In order to remedy these inconveniences, complex mechanisms aiming to displace the articulation axis of each wiper arm in order to increase the surface effectively wiped have already been proposed: According to another conception, which is, for example, described and represented in documents DE-A-4.234.202 or FR-A-2.658.460, it has been proposed to carry out linear sweeping wiping of the window to be wiped by means of wiper mechanism comprising a guide and drive carriage which is mounted sliding relative to the vehicle body on at least one guide rail, or the equivalent, which extends the length of the window to be wiped, the length of the lower or upper edge of the window, or simultaneously the length of the two parallel edges of the window. The carriage bears a close end of an arm or of a wiper blade, the far end of which bears a window wiping scraper.

According to another conception, the wiper mechanism also comprises driving means of the carriage including, for example, a flexible driving element in a closed loop held between two pulleys and which is linked to the carriage, and a driving motor that transmits a running movement to the flexible guiding element. Thanks to such a conception, the wiper blade born by the wiper arm, or directly by the carriage, can carry out a quasi-complete wiping of the window to be wiped the contour of which is generally rectangular.

According to another conception of a reciprocating linear sweeping wiping mechanism described and represented in the document FR-A-2.027.739, this one comprising a guide and drive carriage which is slidably mounted on a least one rigid guide rail and which bears at least one wiper blade, the mechanism being the type that includes driving means of the carriage comprising an electric motor that drives in rotation an elongated element forming an endless screw that extends the length of the guide rail and which crosses a complementary nut born by the carriage.

In all known conceptions, the guide and drive carriage is mounted slidably on the length of at least one rigid guide rail that is produced in the form of a extruded profile. The guiding of the carriage on the rail in the form of a extruded profile is preferably carried out on the inside of the extruded profile, in order to guide the carriage in a precise manner while applying sufficient wiping effort on the wiping scraper and in a manner to carry out the guiding in an internal zone protected from pollution and dirt.

With this goal, the document GB-A-887.114 describes a reciprocating linear sweeping wiping mechanism comprising a guide and drive carriage bearing at least one wiping element, notably an arm or a wiper blade, and which is mounted slidingly on the inside of a rigid longitudinal guide rail produced in the form of a hollow extruded profile which, in a cross-section, comprises two opposing lateral slides in the form of a transversally open C relative to each other and each of which receives at least one complementary stabilization element born by a frame plate of the carriage lodged at least partially inside of the guide rail and which extends in a longitudinally horizontal plane parallel to the wiping plane, and of the type in which the frame plate bears means for longitudinal guiding that cooperate with the complementary means of the extruded profile in order to determine the transversal position of hte frame plate relative to the extruded profile.

According to the proposed conception in this document, the stabilization elements are casters mounted in rotation on the frame plate, around the horizontal axes, and the guiding means are equally made up of a set of casters, born in rotation by the frame plate around the vertical axes, which roll in the complementary gutters of the extruded profile.

It results in a complex conception of the extruded profile, a large number of components mounted in rotation and are thus susceptible to be used in making harmful sets appear as good guiding of the carriage, or which can be blocked by augmenting the general rubbing drag of the carriage relative to the guide rail.

SUMMARY

In order to remedy these inconveniences, this invention proposes a mechanism of the type described and represented in document GB-A-887.114, characterized by the transversal positioning means of the frame plate relative to the extruded profile comprising a rigid rib with a transversal orientation born by the extruded profile, or by the frame plate, which is received via longitudinal sliding in a complementary longitudinal groove vertically open borne by the frame plate, or the respective extruded profile, and by each stabilization element being a stabilization pad which is received via longitudinal sliding on the inside of the corresponding C-shaped slide.

According to other characteristics of the invention:
the guide groove belongs to the frame plate of the carriage and is attached under a lower face of the frame plate in order to receive by sliding a rib formed in relief towards the top on an internal face of the extruded profile;
the groove belongs to a molded element, in a plastic material, brought back onto the frame plate, in the form of an element molded onto the plate;
each stabilization pad is received without play, according to a vertical direction, in the corresponding C-shaped slide;
each pad is elastically deformable in order to allow limited swing of the frame plate around a longitudinal horizontal axis;
the peripheral external surface of each stabilization pad that cooperates with the horizontal internal parallel and opposing faces of the corresponding slide in the shape of a C comprising a coating with a weak friction coefficient;
each stabilization pad is in the general shape of a flattened ring that is mounted on a rod of the frame plate that extends transversally to the inside of the corresponding C-shaped slide;
one of the internal horizontal parallel and opposing faces of the C-shaped slide is made up of the coplanar free edges of at least one longitudinal rib of the extruded profile;

the frame plate of the carriage bears at least two stabilization pads attached in a triangle among which two of the pads are received by sliding on one of the slides, while the third stabilization pad is received by sliding in another of the two C-shaped slides;

the guide rib is received without play according to the transversal direction to the inside of the complementary guide groove;

the frame plate is produced in serrated, folded and/or stamped, extruded, cut, punched sheet metal or molded with aluminum alloy or with plastic allowing one to obtain pads and slides cast in one piece to facilitate recycling;

the frame plate includes means for its joining with a flexible drive element of the carriage;

the extruded profile is produced in one piece, by extrusion or by molding;

the extruded profile comprises a continuous horizontal lower wing from which the C-shaped stabilization slides extend, and by the upper extruded profile face comprising at least one longitudinal slit for the passage, towards the exterior of the rail, of a pad that links the frame plate to the wiping element.

BRIEF DESCRIPTION OF THE DRAWING

Other characteristics and advantages of the invention will appear in the reading of the detailed description that follows, in which one will refer to the attached drawings in which:

FIG. 2 is a perspective view from below the ensemble illustrated in FIG. 1; and

FIG. 3 is a partial section view by a transversal plane passing by two stabilization pads.

DESCRIPTION OF THE PREFERRED EMBODIMENT

Figure 1:
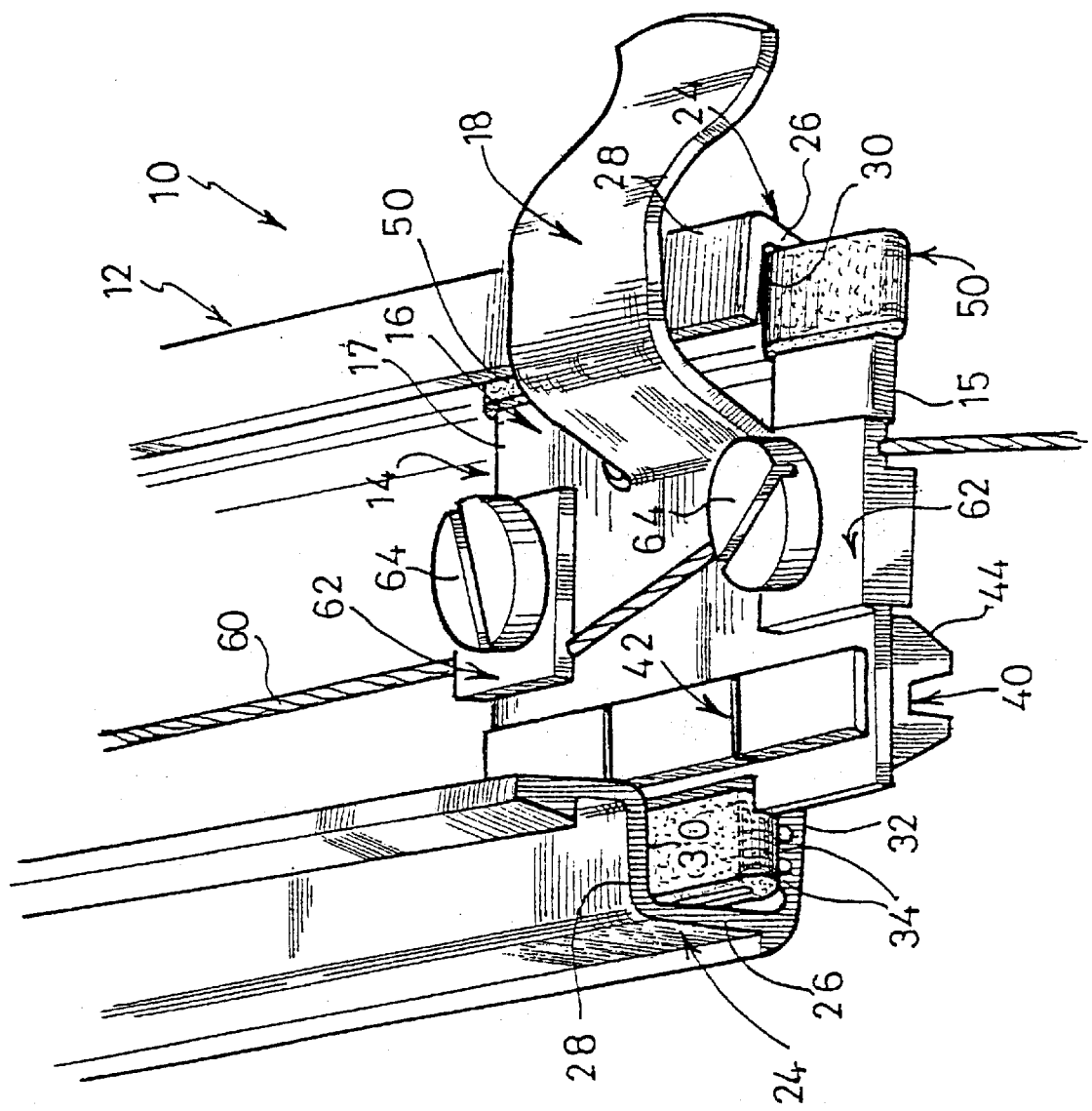
FIG. 1 is a schematic perspective view from above of a section of the extruded profile of the guide rail according to the invention in association with the complementary guide carriage.

In the description that follows, identical, similar, or analog elements or components will be designated by the same reference numbers.

One will use in a non-limiting manner of the invention, the terms "vertical," "horizontal," "upper," "lower," etc. are in reference to the figures.

Certain components of a reciprocating linear sweeping wiping mechanism 10 are represented on the figures and notably a guide rail 12 produced in the shape of a longitudinal extruded profile, here in a rectilinear example, and a guide and drive carriage 14 of a wiping element 20, a section of which is represented, which is for example a wiper arm, a wiper blade, or directly a wiping element in the shape of a wiping strip in a flexible material.

The carriage 14 is made up of, essentially, a frame plate 16 extending horizontally in reference to the figures and which is notably produced by cutting and bending a plate of thick sheet metal.

From the plate 16, the carriage 14 comprises a linking pad 18 extending to the exterior of the extruded profile 12 and bent in order to be prolonged by the wiping element 20 represented in silhouette on FIG. 3.

The conformation of the carriage with its frame plate 16 is such that the horizontal frame plate 16 reaches appreciably in a plane parallel to the plane of the window to be wiped (not represented.)

The extruded profile 12 is produced, for example, in metal by extrusion in a plastic material reinforced by extrusion or by molding, and it is made up of a solid and continuous lower horizontal wing 22 which is vertically demarcated towards the top by an internal upper horizontal face 24 of the extruded profile 12.

The wing 22 comprises, attached to each of its two opposing left and right transversal ends, considering FIGS. 1 to 3, two opposing lateral slides 24 each of which is, in a transversal section, appreciably in the shape of an C open transversally towards the inside of the extruded profile 12.

In this way, each slide 24 comprises a lateral vertical side panel 26 corresponding to the vertical branch of the C, a horizontal upper wing 28 demarcating a horizontal internal and lower face 30, and a lower horizontal wing 32 that extends in the extension of the lower principal wing 22 of the extruded profile.

The upper internal horizontal face of the wing 32 is in fact made up of the upper coplanar free edges 34 of at least one parallel longitudinal rib 36 which are formed in relief on the internal upper face 24 of the wing 22.

In order to transversally position the frame plate 16 inside the extruded profile 12, and conforming to the specifications of the invention, the upper internal face 24 of the principal wing 22 of the extruded profile 12 comprises a rectilinear longitudinal rib 38 which extends vertically in relief towards the top and which is received, without transversal play, in a complementary rectilinear longitudinal groove 40 attached under the lower face 15 of the frame plate 16.

More precisely, the groove 40 is a groove unblocking vertically towards the bottom which is formed in a guide element 42 which is, for example, a molded piece of plastic brought back onto the plate 16, for example, via molding onto the latter.

The piece 42 comprises the reinforcement grooves 44 in order to avoid its deformation, that is to say so, that the groove 40 keeps constant transversal dimensions in order to avoid any play according to the horizontal transversal direction in a manner that guarantees a precise positioning and good longitudinal guiding of the carriage 14 relative to the extruded profile 12.

In order to stabilize the carriage 14 by sliding to the inside of the extruded profile 12, that is to say, in order to avoid its toppling in an untimely manner around an axis theoretically horizontal and longitudinal in reaction to the wiping effort, one has produced stabilization means made up of, here, three stabilization pads 50.

The stabilization pads 50 are attached in a triangle, that is to say, that the frame plate 16 bears from one side, to the left considering the figures, a central pad 50 received in the left glide slide 24, while its transversal opposing right edge bears two stabilization pads 50, longitudinally spaced and which are both received simultaneously in the other right guide slide 24.

As one can see in FIG. 3, the body of each guide pad 50 is preferably made up of a flattened ring 52 in an elastically deformable material, for example, in an elastomer material, which is transversally slipped onto a rod 54 made up of a tab coming from the cutting of the plate 16. Each flattened ring or coil 52 is covered in a covering 56 of a material with a low friction coefficient.

The dimensions of each stabilization pad 50 are such that it is mounted without play according to the vertical direction between the opposite upper 30 and lower 34 internal faces of the C-shaped slide 24 in a way as to assure a good guide and good stabilization of the plate 16 relative to the extruded profile 12.

The elastic deformation capacity of each stabilization pad 50, comprising a flattened ring or coil 52 in an elastomer material, allows the temporary clearing of the exceptional efforts applied on the carriage in the direction of toppling around a horizontal axis, all while assuring a good guide precision by sliding in normal use.

As one can see in FIGS. 1 and 2, the frame plate 16 of the guide carriage 14 also comprises means for assuring its translation liaison with a flexible guide element 60 by sliding from the carriage 14 relative to the extruded profile 12 which is here made up of a cable 60.

The cable 60 passes above the upper face 17 of the plate 16 and is mounted gripped by two clips 62, longitudinally spaced, and at least one vertically oriented screw mounted screwed across the plate 16 in a lower nut 66 attached under the lower face 15 of the plate 16.

In order to assure good positioning and good grip of the cable 60 by the clips 62, they are immobilized in rotation around their gripping axis thanks to complementary cuts (not represented) formed in the plate 16.

Thanks to the arrangements according to the invention, the guiding of the carriage 14 by the frame plate 16 to the inside of the extruded profile 12 is precise according to the transversal direction, that is to say, without play along this direction, and it is stabilized thanks to pads 50, and this without resorting to any turning element such as one or several wheels or casters, as in the state of the art.

The invention finds itself applicable to all types of linear sweeping wiping mechanisms, and appreciably regardless of the orientation of the extruded profile in the space, the horizontal direction notion having been chosen here in reference to the figures in order to facilitate the description and writing about the claims.

The invention is not limited to the production method that was just described. The complementary attachment of the rib 38 and the groove 40 can be reversed, that is to say that the groove 40 can be produced from a material via extrusion with the extruded profile 12 while the guide rib is thus borne by the lower face 15 of the chassis 16 of the carriage 14.

It is also possible to reverse the conception of the stabilization pads and the C-shaped slides that receive them.

To this end, it is possible to conform the lateral opposite edges of the frame plate 16 in the shape of a C-shaped slide that thus receives the stabilization pads produced in the form of continuous horizontal wings of the extruded profile, the elastically deformable elements in an elastomer material and the friction coverings being thus attached in the slides, of reduced length, borne by the frame plate 16.

In addition, the invention is not limited by the choice of materials that were previously mentioned. As a matter of fact, the perfect transversal positioning of the frame plate 16 relative to the extruded profile 12, thanks to the cooperation of the rib 38 and the groove 40, avoids all intrusive rubbing of the external lateral faces of the pads 50 with the internal lateral faces opposite the vertical side panels 26 of the C-shaped slides 24.

What is claimed is:

1. A reciprocating linear sweeping wiping mechanism comprising a guide and drive carriage bearing at least one wiping element which is slidingly mounted inside a rigid longitudinal guide rail in the form of a hollow extruded profile includes two opposite lateral slides in the shape of a transversally open C opposite one another and each of which receives at least one complementary stabilization element born by a frame plate of the carriage at least partially lodged inside the guide rail and extending in a horizontal longitudinal plane, and of the type in which the frame plate bearing longitudinal guide means that cooperate with complementary means of the extruded profile in order to determine the transversal position of the frame plate relative to the extruded profile, characterized by the transversal positioning means of the frame plate relative to the extruded profile including a longitudinally oriented rigid rib borne by one of the extruded profile and by the frame plate, which is received longitudinally sliding into a complementary vertically open longitudinal groove borne by the other of the frame plate and the extruded profiles respectively, and by each stabilization element being a stabilization pad which is longitudinally slidingly received inside the corresponding slide.

2. The wiping mechanism according to claim 1 characterized by the guide groove belonging to the frame plate of the carriage and attached under a lower face of the plate in order to slidingly receive a rib formed in relief towards the top on the internal face of the extruded profile.

3. The wiping mechanism according to claim 2 characterized by the groove belonging to a molded element brought back onto the frame plate.

4. The wiping mechanism according to claim 1 characterized by each stabilization pad being received without play, along the vertical direction, in the corresponding C-shaped slide.

5. The wiping mechanism according to claim 4 characterized by each pad being elastically deformable in order to allow a limited toppling of the frame plate around a longitudinal horizontal axis.

6. The wiping mechanism according to claim 1 characterized by the external peripheral surface of each stabilization pad that cooperates with the parallel and opposite horizontal internal faces of the corresponding C-shaped slide including a covering with a low friction coefficient.

7. The wiping mechanism according to claim 1 characterized by each stabilization pad being in the general shape of a flattened ring which is mounted on a rod of the frame plate that extends transversally on the inside of the corresponding C-shaped slide.

8. The wiping mechanism according to claim 1 characterized by one of the parallel and opposite horizontal internal faces of the C-shaped slide being made up of coplanar free edges of two longitudinal ribs of the extruded profile.

9. The wiping mechanism according to claim 1 characterized by the frame plate of the carriage bearing three stabilization pads attached in a triangle, among which two of the pads are slidably received into one of the slides, while the third stabilization pad is slidably received in the other of the two C-shaped slides.

10. The wiping mechanism according to claim 1 characterized by the guide rib received without play along the transversal direction on the inside of the complementary guide groove.

11. The wiping mechanism according to claim 1 characterized by frame plate being produced in formed sheet metal.

12. The wiping mechanism according to claim 1 characterized by the frame plate for linkage with a flexible drive element of the carriage.

13. The wiping mechanism according to claim 1 characterized by the extruded profile being produced as one piece.

14. The wiping mechanism according to claim 1 characterized by the extruded profile comprising a continuous horizontal lower wing from which the C-shaped stabilization slides extend, and by the upper face of the extruded profile comprising at least one longitudinal slit for the passage, towards the exterior of the rail, of a pad linking the frame plate to the wiping element.

* * * * *